Aug. 21, 1945.   A. F. OATLEY   2,383,410
GAS HEATED COOKING OVEN
Filed Dec. 15, 1941   3 Sheets-Sheet 1
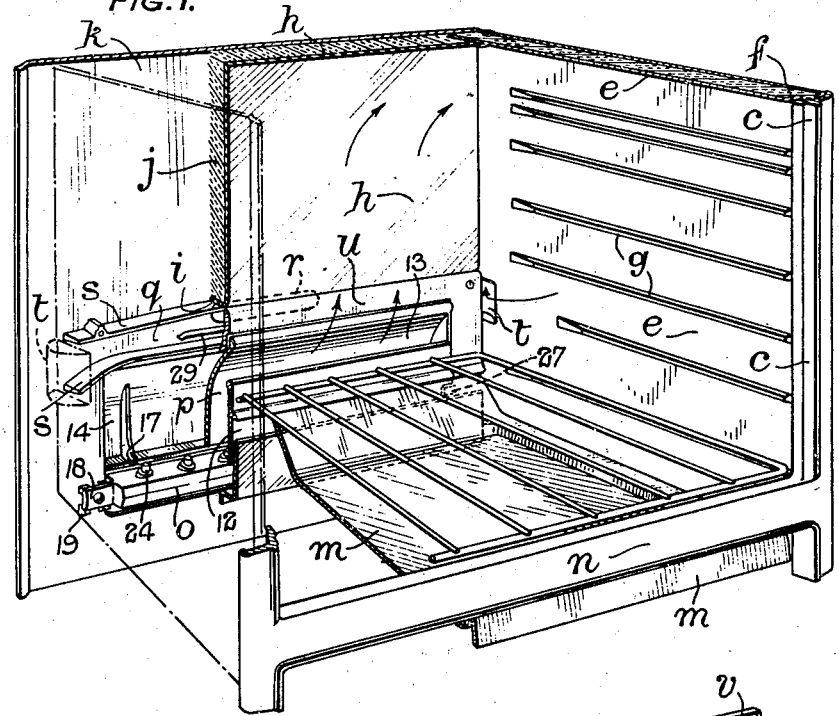
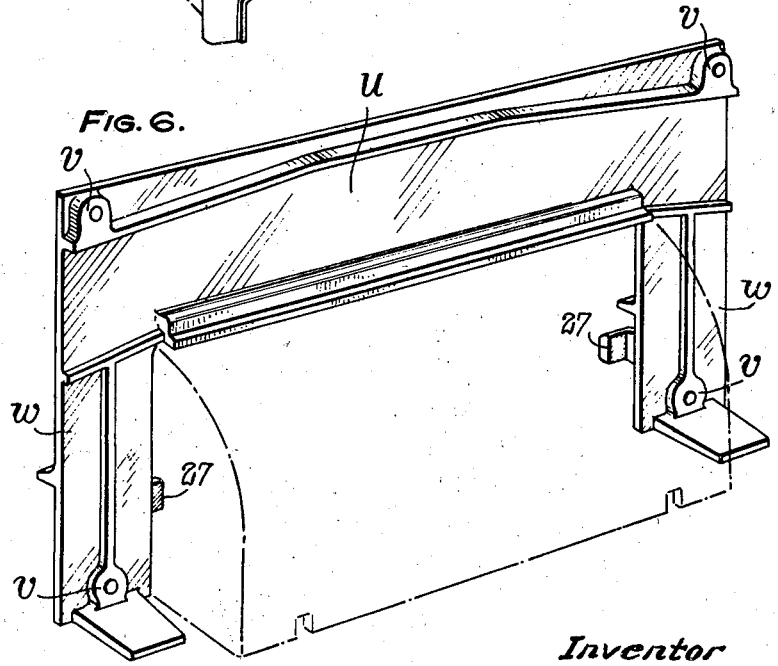
Inventor
ARTHUR FREDERICK OATLEY
Samuel Serviner Jr.
Attorney

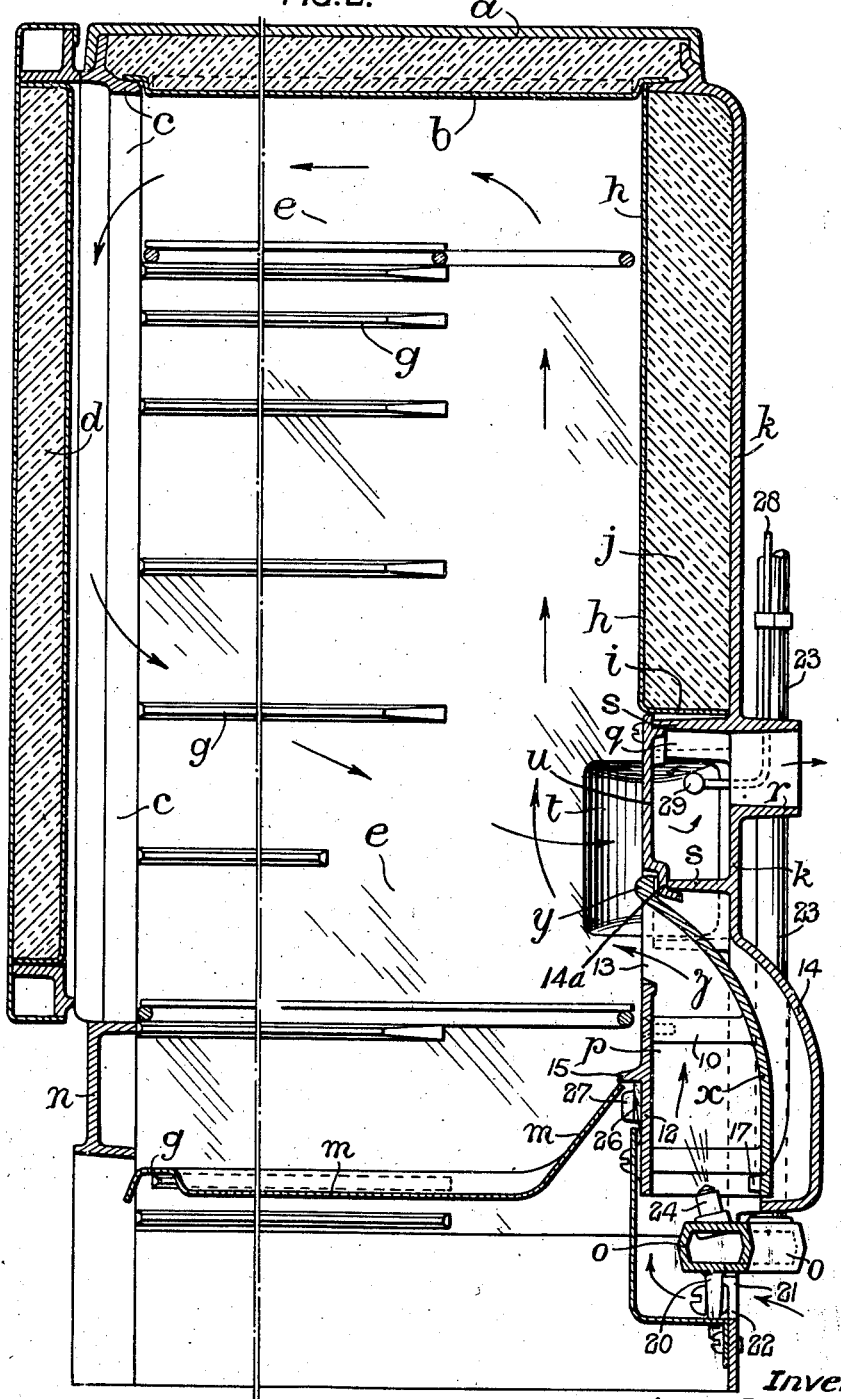

Aug. 21, 1945. A. F. OATLEY 2,383,410
GAS HEATED COOKING OVEN
Filed Dec. 15, 1941 3 Sheets-Sheet 3
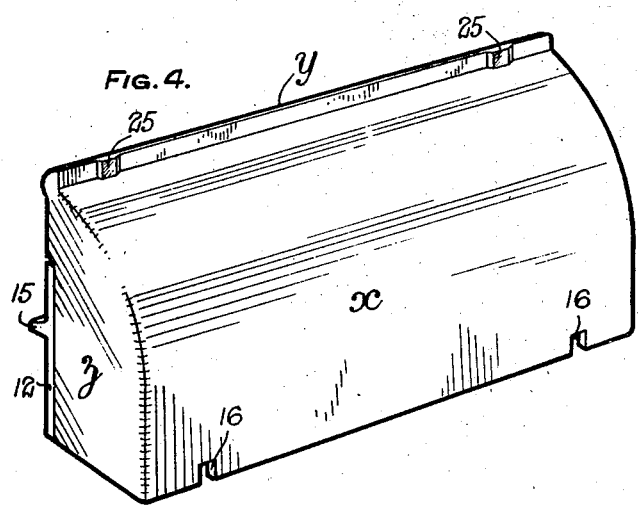
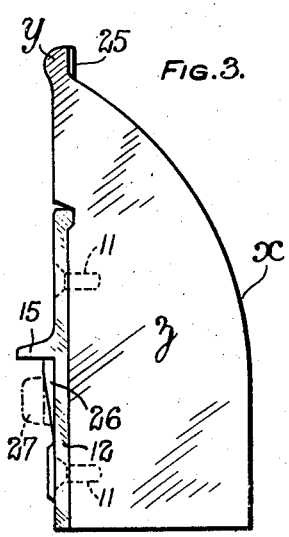
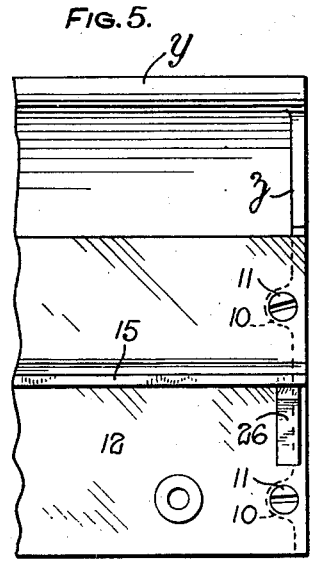
Inventor
ARTHUR FREDERICK OATLEY
Samuel Scrivener Jr.
Attorney Patented Aug. 21, 1945

2,383,410

UNITED STATES PATENT OFFICE 2,383,410

GAS HEATED COOKING OVEN

Arthur Frederick Oatley, Deepfields, England

Application December 15, 1941, Serial No. 423,114
In Great Britain December 16, 1940

2 Claims. (Cl. 126—39)

The invention relates to the heating of ovens and hot chambers of gas heated cooking apparatus and to ovens which are closed at the base.

Such ovens, which term will hereinafter include hot chambers for keeping food in a heated condition, are usually heated by means of aerated burners arranged along the sides or at the back of the oven and the gas is burnt at a number of nozzles or jets within the oven chamber.

In accordance with my invention, in such an enclosed oven, I arrange a luminous flame burner in the lower part of the back wall of the oven in a position where it is below and in close proximity to an outlet flue at the back of the oven sealed from the combustion chamber; the inlet of hot gaseous products to the oven from the combustion chamber being above the base of the oven and under an arched or forwardly extending back wall of the combustion chamber, and the outlet from the oven to the said flue being carried through the side walls of the oven or through side portions of the back wall of the oven beyond the ends of the combustion chamber.

The combustion chamber is preferably removable bodily from the oven so that it can be more readily cleaned, and to give access to the burner nozzles. The latter are set inclined slightly forwardly so that the jets are directed toward the opening above the front wall of the combustion chamber.

The back wall of the chamber is preferably curved at its upper part and made reflecting on its front face so that an image of the luminous flame jets from the burner, which is down in the chamber out of sight, can be seen from the front of the oven.

The combustion chamber is isolated as far as possible from metallic contact with the back wall or the parts of the oven.

The appended drawings illustrate a convenient constructional embodiment.

Figure 1 is a broken perspective view looking into the oven.

Figure 2 is a sectional elevation of the oven with parts broken away to economize space on the sheet.

Figure 3 is a side view of the combustion chamber removed from the oven.

Figure 4 is a back perspective view thereof.

Figure 5 is a fragmentary front elevation thereof, and

Figure 6 is a rear perspective view of a surround plate for the combustion chamber in the back wall.

In these drawings $a$ is the top of the oven suitably lagged and with an inner lining plate $b$; $c$ is a front frame; $d$ is a door; $e$ is a lining plate of a side wall which has a small return flange $f$ on the front, see Figure 1, to receive the frame $c$; $g$ represents ribs on the side walls for supporting shelves and trays in the usual way; $h$ is the lining plate of the back wall which finishes in a flange at $i$ where the flue and combustion chamber hereinafter referred to are arranged across the back wall; $j$ is the lagging and $k$ the casting of the back wall. The bottom plate $m$ of the oven is shown as a pressed metal spillover tray which slides on the lowermost ribs $g$ on the side walls below the bottom cross bar $n$ of the front frame $c$; but it may be arranged above the bar $n$ if desired.

The construction of the oven may follow on any suitable lines so far as concerns the above constructional details.

The heating arrangements with which the invention is concerned comprise the burner, which is generally referred to by the letter $o$; the combustion chamber, to which the general reference $p$ is given; and the outlet flue chamber from the oven with the general reference $q$.

Just below the flange $i$ of the back wall lining plate $h$ the back wall casting has a rear flue outlet nozzle $r$ and two separated, forwardly projecting ribs $s$ which form the top and bottom walls of the transverse outlet flue chamber $q$ from which the nozzle $r$ leads.

The ribs $s$ incline downwardly slightly toward the sides of the oven to bring the flue chamber at each end into communication with the oven interior by means of the semi-cylindrical recesses $t$ in the side walls.

The front of this flue chamber $q$ is formed by a plate $u$ which is secured by screws from the back of the oven entering bosses $v$, Figure 6, on the plate. The plate $u$ has two vertical pillars $w$ at the ends and into the space between them the combustion chamber $p$ is fitted.

In a preferred embodiment the combustion chamber $p$ consists of a rear wall $x$, about twelve or thirteen inches in length, the upper part of which is forwardly curved and finishes in a bead or lip $y$ with a straight rear edge. This rear wall is preferably cast integral with two return or end walls $z$ each of which is provided with two or more embossments 10 along its inner edge so as to form thicker parts which can be internally screw threaded to receive attachment screws 11 for a separately cast front wall 12. The front wall 12 is of less height than the back wall and is spaced one inch to an inch and a half below the vaulted upper part of the back wall and this space forms an outlet opening 13 from the combustion chamber. This combustion chamber is arranged in, but is out of actual contact with, the back wall $k$ of the oven which is preferably cast with a downwardly and outwardly curving skirting 14 which approximately conforms with the curved upper part of the back wall of the combustion chamber, but it is spaced away therefrom so as to leave an insulating air space between the two, but this air space has no connection with the outlet flue chamber $q$ above. Immediately above this curved skirting part on the vertical oven wall, I form the surround plate $u$, which is really a part of the back wall of the oven, with a shoulder 14a which extends along the wall horizontally, directly above but spaced from the upper lip or bead $y$ of the combustion chamber. This spaced shoulder and the lip or bead of the combustion chamber form a drain channel to direct any condensation, or any fatty or other substances from the wall above away from the opening of the combustion chamber.

The front wall 12 of the combustion chamber stands up well above the rear edge of the bottom plate or tray $m$ of the oven and preferably has a lip 15 overhanging the rear edge of the same bottom plate as clearly seen in Figures 2, 3 and 5. The combustion chamber may be located in position by notches 16 in the edge of its rear wall $x$, taking over bracket lugs 17, Figures 1 and 2, cast with or formed on the back wall of the oven just above the position in which the burner $o$ is secured. The burner may be secured by means of lugs 18 at the ends fitting against seating blocks 19 on the back wall casting and screwed to that wall and also by a central tongue 20 screwed to a projection 21 on the back wall casting of the oven. At this level an opening 22 or series of controllable openings will be provided in the back wall casting to admit air around the burner and to the opening at the bottom of the combustion chamber for supporting combustion. As will be seen the burner is supplied with gas from a supply tube 23 and this gas is burnt at the nozzles 24 which are slightly inclined forwardly so as to direct the flames toward the top of the front wall 12 of the combustion chamber.

The back of the lip $y$ of the combustion chamber is provided with slight contact projections 25 which rest against the shouldered lower part of the surround plate $u$ and the front wall of the combustion chamber at each end is provided with a ramp surface 26 the forward face of which contacts a lug 27 projecting inwardly from the inner front edge of the pillar $w$ at each end of the plate $u$. The inclined ramp surfaces enable a good rigid fit of the combustion chamber in the correct position to be obtained.

The combustion chamber can be bodily rocked forwardly from the inside of the oven and removed for cleaning and other purposes and as readily pushed back again into place. When it is in place the combustion chamber, except for these small points of contact, is isolated from the remainder of the back of the oven and practically no heat transference by conduction can take place. With this arrangement of the combustion chamber and the luminous flame burner with its nozzles right at the bottom of the chamber, thorough combustion of the gas takes place in the incoming air within the chamber and the hot products of combustion are forwardly and slightly upwardly directed into the oven chamber practically filling the rear part thereof and tend to fall and divide after passing around the front of the oven to the outlets from the oven formed by the recesses $t$ and so into the outlet flue chamber. Uniformity of temperature over the whole width of the oven is obtained and a high efficiency and very satisfactory working conditions result.

As shown by the reference 28 in Figure 2 a supply for a liquid thermostatic tube 29 can be provided and this thermostatic tube 29 can be arranged along the transverse outlet flue chamber where the most effective conditions for temperature control are found.

The burner may be lighted at the opening 13 and the vaulted top of the inner wall, if polished or enamelled, reflects the flames so that, although the burner is concealed, one can see from the front of the oven that the gas at all the nozzles has been ignited.

If desired instead of providing the recesses $t$ in the side walls of the oven which allow the hot gases to pass around the side edges of the plate $u$ and into the flue chamber $q$ on their way to the outlet nozzle $r$ I may provide openings in the end parts of the surround plate $u$. These openings will, however, be outside the end walls of the combustion chamber.

On the other hand I may form the outlets from the oven at points in the side walls nearer the front of the oven and arrange passages leading into the ends of the outlet flue chamber $q$.

In this illustrated embodiment of construction the flue outlet nozzle $r$ and the ribs $s$ forming the top and bottom walls of the transverse flue chamber are in one casting with the back wall casting, but they need not be so made as they can readily be made as a separate unit and fixed in place relatively to the back wall.

I claim:

1. Gas heated cooking apparatus comprising in combination an oven having side walls, a front having a door opening therein, a door for said opening, a back wall, a top and a base plate, a combustion chamber removably supported between the rear edge of the base plate and the back wall and having a front wall, ends and a forwardly arched rear wall the upper edge of which lies above and substantially in the plane of the front wall and with the upper edge of the front wall defines an opening in the back wall of the oven which is relatively narrow with respect to the depth of the combustion chamber and through which the combustion chamber communicates with the interior of the oven, the combustion chamber having a second opening at the lower part thereof through which the combustion chamber communicates with the atmosphere, a burner directly below the opening in the lower part of the combustion chamber, means forming an outlet flue chamber communicating with the atmosphere and extending transversely across the back of the oven and directly above the combustion chamber, recesses formed in the side walls of the oven and parts of which recesses lie in the interior of the oven and parts of which recesses overlap the ends of the outlet flue chamber to afford communication between the interior of the oven and the ends of the flue chamber, said flue chamber having no other communication with the combustion chamber.

2. Gas heated cooking apparatus as claimed in claim 1 wherein the ends of the front wall of the combustion chamber are provided with ramps and wherein the transverse flue chamber is formed by forwardly projecting upper and lower ribs integral with the back wall of the oven and a detachable plate which closes against the forward edges of said ribs and is provided with vertical end pillar portions which are positioned adjacent the ends of the combustion chamber and carry transversely-extending lugs which are adapted to engage the forward portions of the ramps formed on the ends of the front wall of the combustion chamber to thereby position the combustion chamber between the lugs and rear wall.

ARTHUR FREDERICK OATLEY.